United States Patent [19]
Huang

[11] Patent Number: 5,816,933
[45] Date of Patent: *Oct. 6, 1998

[54] GOLF CLUB SHAFT GRIP

[76] Inventor: Ben Huang, 19472 Woodlands La., Huntington Beach, Calif. 92648

[ * ] Notice: The term of this patent shall not extend beyond the expiration date of Pat. No. 5,813,921.

[21] Appl. No.: 777,933

[22] Filed: Dec. 23, 1996

Related U.S. Application Data

[63] Continuation-in-part of Ser. No. 567,339, Dec. 28, 1995, abandoned, and a division of Ser. No. 632,578, Apr. 15, 1996, Pat. No. 5,671,923.

[51] Int. Cl.⁶ .................................................. A63B 49/08
[52] U.S. Cl. ............................................. 473/301; 473/549
[58] Field of Search .................................... 473/300, 301, 473/302, 549, 550, 551, 568

[56] References Cited

U.S. PATENT DOCUMENTS

| | | | |
|---|---|---|---|
| 1,940,104 | 12/1933 | Russell et al. | 473/301 |
| 3,087,729 | 4/1963 | Sullivan | 473/301 |
| 3,311,375 | 3/1967 | Onions | 473/301 |
| 5,374,059 | 12/1994 | Huang | 473/301 |

*Primary Examiner*—William M. Pierce
*Attorney, Agent, or Firm*—Fulwider Patton Lee & Utecht, LLP

[57] ABSTRACT

A golf club shaft grip having a polyurethane layer bonded to a felt layer. The bonded-together layers are configured as a strip which is spirally wrapped about the shaft. A cap is then telescopically applied over the upper end of the shaft to prevent unraveling of the strip from the shaft.

12 Claims, 4 Drawing Sheets

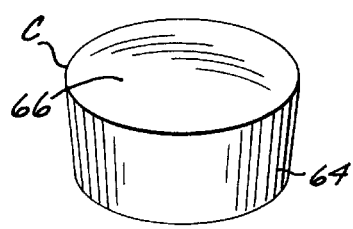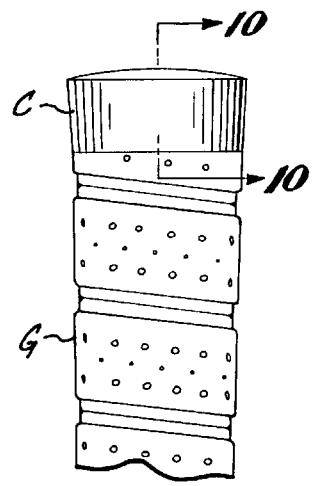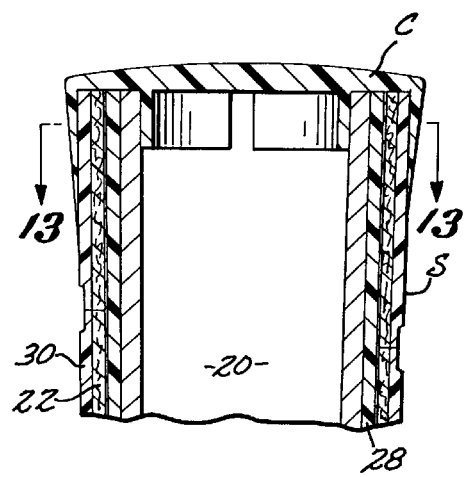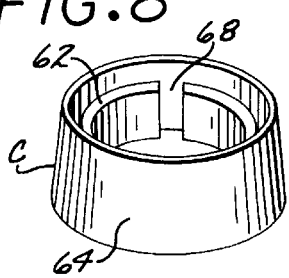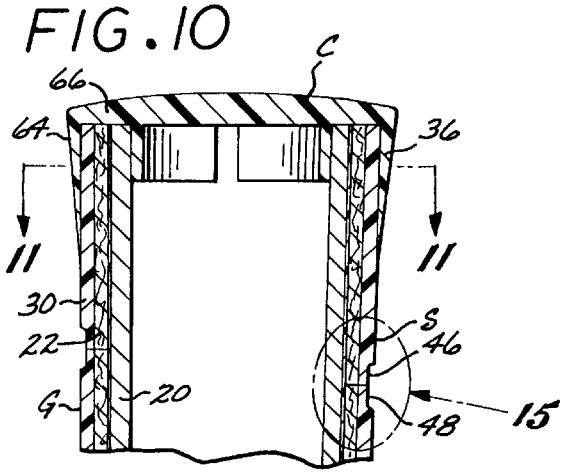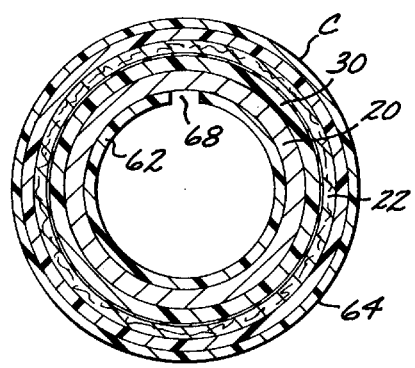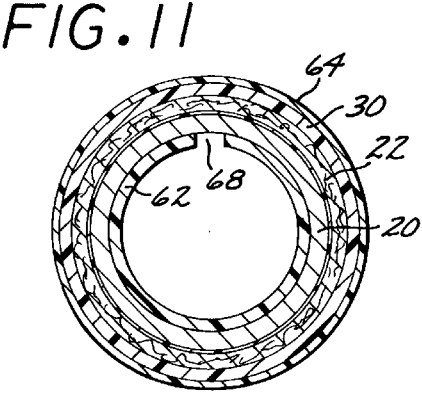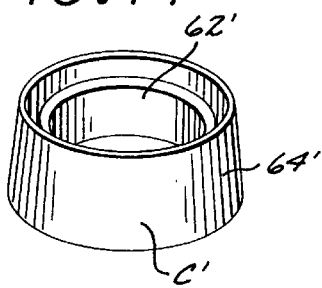

GOLF CLUB SHAFT GRIP

This application is a Continuation-In-Part of application Ser. No. 08/567,339 filed Dec. 28, 1995, abandoned, and a Division of application Ser. No. 08/632,578 filed Apr. 15, 1996, now U.S. Pat. No. 5,671,923.

BACKGROUND OF THE INVENTION

The present invention relates to an improved golf club shaft grip.

It is well known that shock generated by impact between a golf club and a golf ball can adversely affect muscle tissue and arm joints such as elbow joints. The energy generated by such shock is usually of high frequency and short duration with rapid decay, and which is often known as "impact shock." Tight grasping of a grip to keep it from slipping contributes to the shock to the muscle tissue and arm joints of the users golf clubs.

Prior art golf club shaft grips have utilized a layer of polyurethane backed with a layer of felt. In general, the felt layer has a thickness of about 1.40 mm. The polyurethane layer is generally thinner than 0.25 mm, and has been considered only as providing tackiness, i.e., resistance to the slip caused by a sweaty hand. The polyurethane has not been considered to be useful for inhibiting shock. The felt was relied upon to cushion the user's arm and hand against the shock created when the club strikes the ball.

Applicant has previously developed resilient grips which successfully reduce shock to the muscle and arm joints of the users of golf clubs, tennis racquets, racquet ball racquets, baseball bats, and other impact imparting devices such as hammers. See, for example, U.S. Pat. No. 5,374,059 granted to applicant Dec. 20, 1994. Such earlier grips utilize a polyurethane layer bonded to a felt layer to define a strip which is spirally wrapped around the handle of a golf club or racquet to conform to the external configuration of such handle. In such earlier grips of applicant's design the thickness of the polyurethane layer relative to the thickness of the felt layer as compared to prior art resilient grips, i.e. the ratio of the thickness of the polyurethane layer to the thickness of the felt layer was a minimum of approximately 0.18, with the thickness of the polyurethane layer having been about equal to or thicker than the thickness of the textile layer in a typical grip of my design. In certain of such grips the handle-abutting side of the strip utilized skiving, with the felt layer tapering from a transverse central region upwardly and outwardly towards the transverse side edges of the strip. The side edges of the strip were overlapped as the strip was wrapped around the shaft so that the strip did not have a smooth configuration along its length. Additionally, the skiving tended to weaken the grip. Moreover, the side edges of the strip tended to unravel in use. It was also determined that where the strip was not properly applied to the shaft, the grip would tend to loosen relative to the shaft. Likewise, prior golf club grips employed caps which failed to adequately prevent unraveling of the grip from the golf club shaft.

SUMMARY OF THE INVENTION

Applicant has discovered that polyurethane and felt golf club shaft grips of the aforedescribed nature can be made without skiving to thereby afford a stronger, longer lasting grip. Instead, in the grip of the present invention the side edges of the strip are butted together as the strip is wrapped about the golf club shaft. The resulting grip provides a smoother configuration over the entire grip surface and also resists unraveling from the shaft. The improved grip of the present invention also incorporates an adhesive material that covers the inner surface of the felt layer to facilitate wrapping the strip about the golf club shaft and afford increased securement of the grip to the shaft as the grip is used, with the tighter the grasp of the player the tighter the securement of the grip to the shaft. The grip of the present invention additionally reduces the manufacturing time and therefore the cost of the grip to the user as compared to prior grips. Moreover, it is easier to properly wrap the strip onto the shaft so that even an amateur can obtain a film attachment of a replacement grip to the shaft.

The grip of the present invention also preferably utilizes sidewardly and outwardly curved reinforcement side edges along its length. Such side reinforcement edges inhibit unraveling of the grip from the golf club shaft, enhances the frictional grip of the user and provides an improved appearance over existing grips. This feature also reduces interference with other golf club grips as club is withdrawn from a golfer's bag. The grip of the present invention may either be used to as a replacement grip, or, alternatively be fabricated as original equipment by a manufacturer of golf clubs. The grip may include a tapered rubber-like sleeve about which the strip is spirally wrapped, or the strip may be spirally wrapped directly upon the handle portion of golf club shaft.

It is an important feature of the grip of the present invention that the grip includes a unique cap which cooperates with the spirally wound strip to prevent unraveling of the strip from the golf club shaft both during play, and more importantly as a golf club is withdrawn from and returned to a golfer's bag.

The golf club grip of the present invention has been found to greatly cushion the shock transferred from a golf club to the golfer's body and thereby prevent the danger of injury to the golfer during a golf swing. Yet the golf club grip of the present invention can be made lighter than conventional grips to reduce the grip weight of a golf club permitting redistributing the weight to the golf club head thereby increasing the moment of inertia with a resulting increase in the distance of travel of a golf ball. The golf club grip of the present invention can also reduce the total weight of a golf club and thereby permits a higher club head speed for greater distance of travel of a golf ball.

These and other features and advantages of the present invention will become apparent from the following detailed description, when taken in conjunction with the accompanying drawings.

BRIEF DESCRIPTION OF THE DRAWINGS

FIG. 7 is a perspective view showing a cap member of the grip of the present invention.

FIG. 8 is a perspective view showing the cap of FIG. 7 inverted from its position of FIG. 7.

FIG. 9 is a broken side elevational view showing the cap of FIGS. 7 and 8 applied over the upper end of the strip of FIGS. 1 and 2 after such strip has been wound about the golf club shaft.

FIG. 10 is a broken vertical central sectional view taken in enlarged scale along line 10—10 of FIG. 9.

FIG. 11 is a horizontal sectional view taken along lines 11—11 of FIG. 10.

FIG. 12 is broken central side elevational view similar to FIG. 10, but showing the strip as applied over the sleeve of FIG. 3.

FIG. 13 is a horizontal sectional view taken along line 13—13 of FIG. 12.

FIG. 14 is a view similar to view 13, but showing a modified form of cap.

DETAILED DESCRIPTION OF PREFERRED EMBODIMENTS

Figure 1:
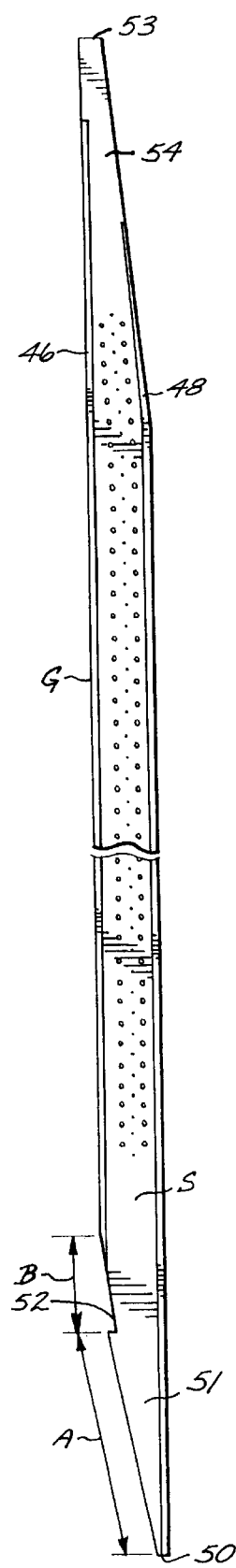
FIG. 1 is a broken top plan view of a resilient strip member of a preferred form of golf club shaft grip embodying the present invention.
Figure 17:
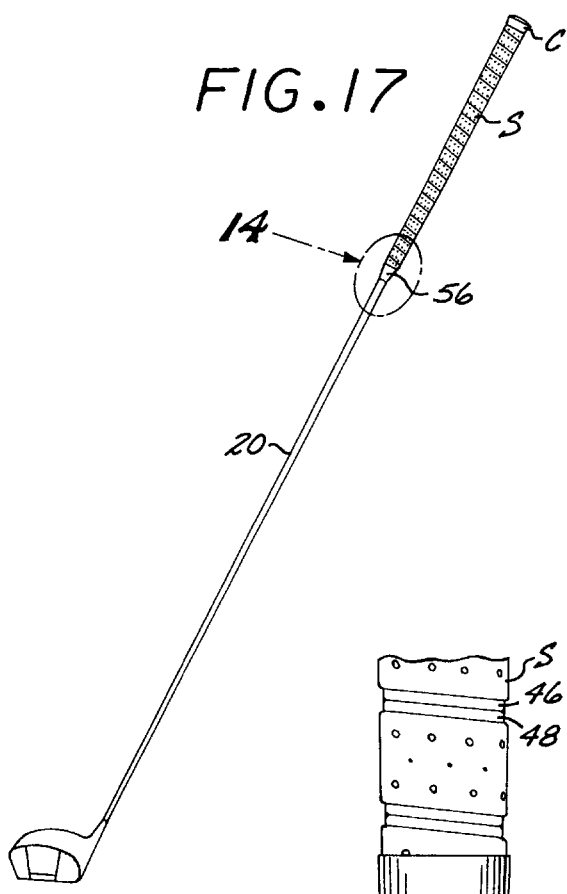
FIG. 17 is a reduced perspective view of a golf club provided with a grip embodying the present invention.

Referring to the drawings, a preferred grip G embodying the present invention utilizes an elongated resilient strip S shown in FIG. 1 which is spirally wrapped about the shaft 20 of a golf club to define a grip G, as shown in FIG. 17. Grip G also includes an annular cap C, shown particularly in FIGS. 7 and 8, which is telescopically received by the upper end of shaft 20 to restrain the strip S from unraveling relative to the shaft.

Figure 4:
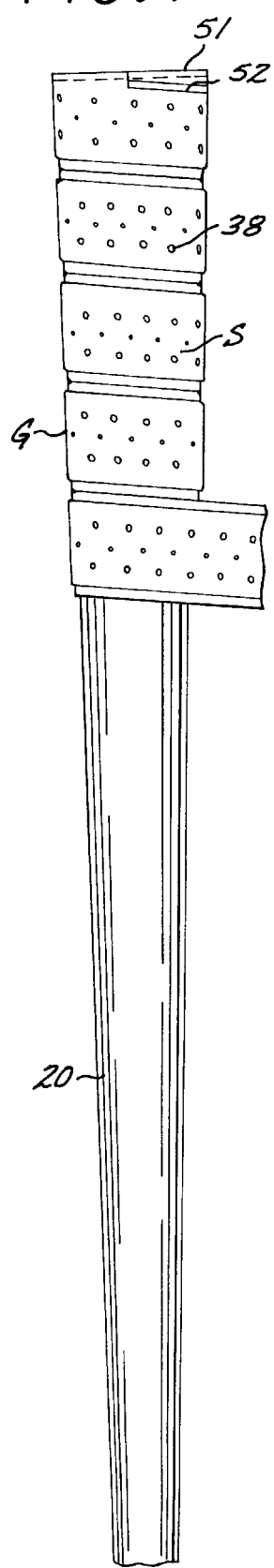
FIG. 4 is a broken side elevational view showing the grip of the present invention being spirally wrapped about the golf club shaft of FIG. 3.
Figure 5:
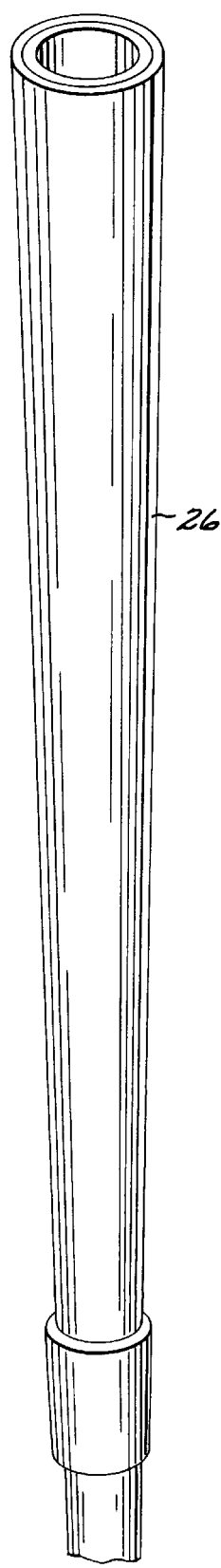
FIG. 5 is a broken perspective view showing a resilient sleeve applied to the upper end of a golf club shaft to receive a grip embodying the present invention.
Figure 6:
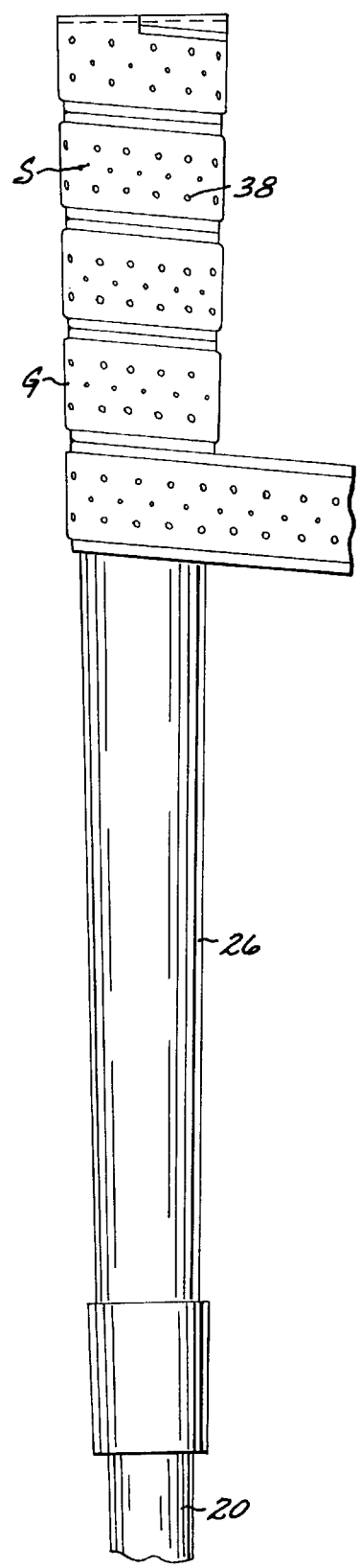
FIG. 6 is a side elevational view showing the strips of FIG. 1 and 2 being spirally wrapped about the sleeve of FIG. 5.

More particularly, grip G includes an open-pored felt layer, generally designated 22, having an inner or bottom surface 24 which is adhered to a golf club shaft 20 as shown in FIG. 4, or alternatively to a resilient sleeve 28 telescopically attached to the upper portion of golf club shaft 20 as indicated in FIG. 6. The smooth closed pore polyurethane layer, generally designated 30, is bonded to the felt layer 22. The bonded-together polyurethane and textile layers are seen to be configured as the unitary strip S shown in plan view in FIGS. 1 and 2.

Figure 15:
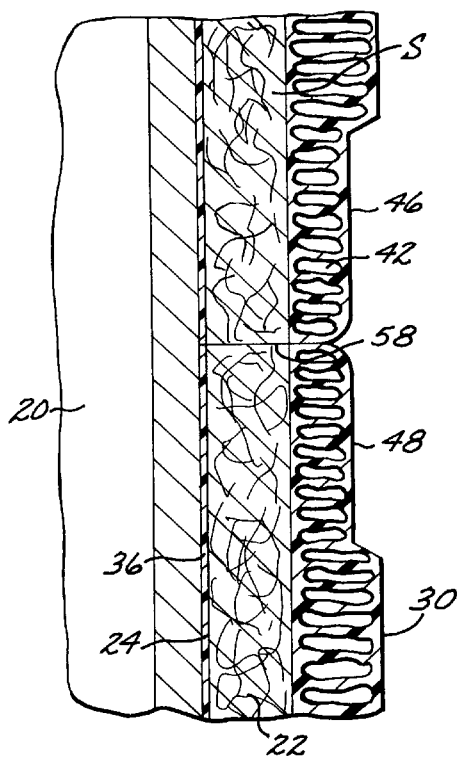
FIG. 15 is an enlarged view of the encircled area designated 15 in FIG. 10.
Figure 16:
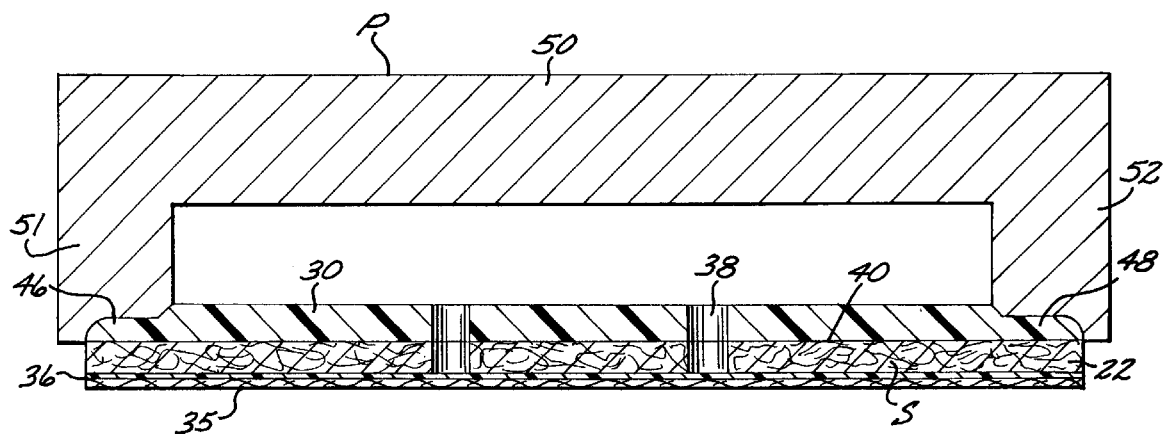
FIG. 16 is an enlarged horizontal sectional view showing a heated platen used to form the side reinforcement edges of the strip.

The polyurethane layer 30 provides a cushioned grasp of the player's hand on a golf club shaft and also enhances the player's grip by providing increased tackiness between the player's hand and the grip. The felt layer 22 provides strength to the polyurethane layer 30 and serves as a means for attaching the bonded-together polyurethane and felt strip to golf club shaft 20. As shown in FIGS. 11, 12, and 15, the underside or bottom 24 of the felt layer 22 is provided with a conventional adhesive material 36 which covers the underside of the felt layer. As shown in FIG. 16, the underside of the adhesive material may be originally covered with a protective quick-release tape 35 which is peeled off when the strip S is to be applied to shaft 20. The polyurethane and felt layers may be formed with vertically extending perforations 38 which enhance the absorption rate of perspiration from a user's hand.

The felt layer 22 of the strip is formed of a suitable open-pored material and has its upper or outer surface bonded to the lower surface 40 of the polyurethane layer 30. As indicated in FIG. 15, the polyurethane layer 30 is formed with pores 42 which extend vertically, i.e. generally normal to the longitudinal axis of the strip S and golf club shaft 20 when the grip has been affixed to such shaft. The polyurethane layer 30 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 42 will extend perpendicularly relative to the longitudinal axis of the strip, while the underside of the polyurethane layer is bonded to the upper surface of the felt strip. As noted hereinbefore, applicant has discovered that greatly improved shock absorbing qualities may be obtained in a golf club grip where the ratio of the thickness of the polyurethane layer to the thickness of the felt layer is increased over such as employed in prior art grips. More specifically, applicant considers that the ratio of the thickness of the polyurethane layer to the textile layer should be a minimum of approximately 0.18. In the embodiment shown in the drawings, the thickness of the polyurethane layer is preferably about 0.4 millimeters and the thickness of the felt layer in about 0.9 millimeters. Excellent results have been obtained with this ratio, since the pores 42 permit the polyurethane layer to be readily compressed by the gripping force of a golfer's hands when making a swing.

In FIG. 16, the strip S is shown being formed with sidewardly and outwardly extending recessed reinforcement side edges, generally designated 46 and 48. The reinforcement side edges 46 and 48 are preferably formed along the major portion of the strip by means of a heated platen P shown in FIG. 16. Referring thereto, platen P may be of conventional metal construction having a horizontal base 50 formed at its opposite sides with depending legs 51 and 52. The lower ends of the legs are configured so as to define and to form the recessed reinforcement side edges 46 and 48. Thus, the lower portion of the legs are provided with like-configured mirror image cavities each having a horizontally extending surface, the inner portions of which extend upwardly and inwardly, while the outer edges thereof are curved sidewardly and downwardly. The platen P is heated in a conventional fashion as by means of electrical resistance elements (not shown) and urged downwardly against the sides of the strip S so as to compress side portions of the polyurethane layer 30 below the upper surface of such polyurethane layer in the manner shown in FIG. 16 to define the recessed reinforcement side edges. Such compression increases the density and hence the strength of the polyurethane layer in the vicinity of its side edges. It has been found that the width of the recessed reinforcement side edges 46 and 48 may be approximately 2 millimeters, while the depth of the major portion thereof may approximate 0.5 millimeters.

Figure 2:
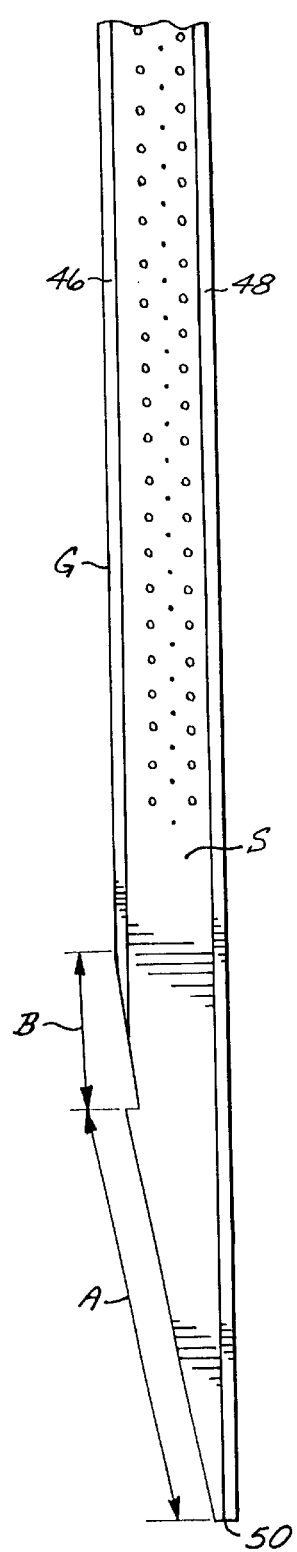
FIG. 2 is a broken top plan view in enlarged scale of the strip shown in FIG. 1 particularly illustrating the starting edge configuration of such strip.
Figure 3:
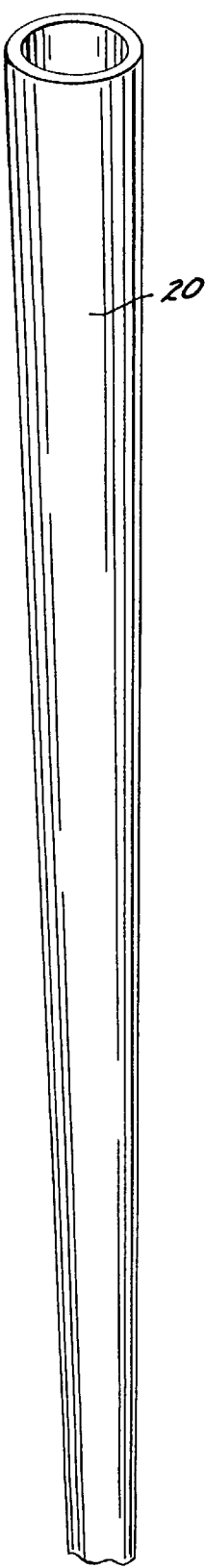
FIG. 3 is a broken perspective view of a golf club shaft adapted to receive the grip of the present invention.

As indicated in FIGS. 1 and 2, the starting end 50 of strip S is cut away at an angle to define a tongue 51. An inwardly extending notch 52 is formed at the inner position of the tongue. The trailing end 53 of the strip is also cut away at an angle to define a second tongue 54. As further shown in FIGS. 1 and 2, the tongue and notch dimensions A and B will differ depending on the dimensions of the butt end of the particular shaft receiving the grip.

Figure 18:
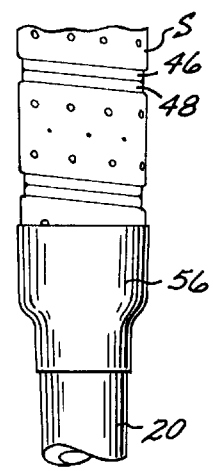
FIG. 18 is an enlarged view of the encircled area designated 18 in FIG. 17.

Referring now to FIG. 4, to apply the strip G to the golf club shaft 20, the quick-release tape 35 is peeled off the adhesive on the underside of the felt layer 22. The strip S is then spirally wound around the shaft starting with the butt or top end of the shaft. As indicated in FIG. 4, starting end (relative to the shaft's butt end) the pointed end of tongue 51 fits snugly within the notch 52 so as to provide a smooth configuration of the strip relative to the exterior of the golf club shaft 20. After the strip S has been completely wound about the shaft 20 its lower end may be secured in place by finishing tape (not shown) and/or a conventional resilient ferrule 56 shown in FIGS. 17 and 18 to prevent unraveling of the lower portion of the strip relative to the shaft. Ferrule 56 may be formed of an expandable material such as polyethylene in order that it can be slipped down the wrapped strip to its position of FIG. 17. It should be noted that tongue 54 permits the strip's trailing end 53 to provide a smooth transition of the strip to the golf club shaft.

As indicated in FIG. 15, the reinforcing side edges 46 and 48 of the strip S do not overlap, and, instead, their radially extending surfaces butt tightly against one another, as shown at 58. It is important to note that the abutting side edges of the strip afford a very firm contact between these side edges, since the polyurethane layer 30 is compressed by the heating platen P when the recessed reinforcing side edges are formed in the manner shown in FIGS. 16. Such compression increases the strength of the polyurethane material in the vicinity of the butt joint. Such firm contact would not be possible if the strip was formed solely of polyurethane, since polyurethane is quite soft as compared to felt. Tight abutment of the strip's side edges ensure that applicant's strip does not unravel even when the grip is exposed to hard wear during play and when a golf club is pulled out of or returned to a golfer's bag. If desired an adhesive (not shown) may be interposed between the abutting side edges, of the grip to further inhibit unraveling. As a result of the aforedescribed abutment, applicant's grip is more durable and hence affords a longer service life than prior art grips. The provision of the recessed reinforcing side edges 46 and 48 further inhibits any tendency of the strip to unravel, enhances the appearance of the grip and improves the frictional contact of the user's hand and the club grip.

Referring now particularly to FIGS. 7–10, annular cap C is of integral construction and includes a vertical inner skirt 62, a vertically tapered outer skirt 64, and a horizontal slightly domed cover 66. Cover C is preferably molded from a stiff, synthetic plastic material, such as polypropylene or polyethylene. A vertically extending expansion slot 68 is formed in inner skirt 62. It is desirable that the inner skirt taper at the same angle as the interior of shaft 20 and be tightly telescopically received by the upper open end of shaft 20. Expansion slot 68 permits a tight fit to be obtained between the inner skirt and the interior of the golf club shaft even where the outer diameter of the inner skirt is slightly greater than the shaft's inner diameter. Also, the inner diameter of outer skirt 64 should be so dimensioned that it can tightly telescopically enclose the first wrap of strip S, as shown in FIG. 10. It has been determined that an outer skirt depth of about 8 mm for a conventional driver affords good results.

Cap C is secured to the upper end of shaft 20 after strip S has been spirally wrapped thereabout. It is important that the outer skirt 64 extend downwardly a sufficient distance over the upper portion of the wrapped strip to ensure the strip does not unravel relative to the shaft when a golf club is being used in play, and particularly when the club is being removed from and returned to a golf bag by contact with the other golf clubs in the bag. The dimensions of the outer skirt, however, should not interfere with the golfer's grasp of the club. Cap C is seen to cooperate with the abutting recessed reinforcing side edges 46 and 48 and ferrule 56 to effectively prevent unraveling of the strip from the shaft. Thus, cap C and ferrule 56 prevent movement of strip's abutting side edges away from one another along the shaft and also prelude unwrapping of the upper and lower portions of the strip wraps relative to the shaft.

In FIG. 14 there is shown a second form of cap C', wherein the inner skirt 62' is of solid configuration. Such cap can be formed of a resilient material, such as rubber.

Referring now to FIGS. 5, 6, 12, and 13, grip G is shown spirally wrapped about resilient sleeve 28 which has been telescopically fitted over the handle portion of a golf club. The strip S and cap C are applied as described hereinbefore over such sleeve. It should be noted that where grip G is directly applied over a golf club shaft the total club weight can be reduced as compared to conventional golf clubs. Also, the club weight is redistributed toward the golf club head to thereby increase the club's moment of inertia with a resulting increase in golf ball travel. Conventional grips weight about 53–57 grams, while typical grips of the present invention will weigh about 10–13 grams. Thus, direct application of the present grip over a golf club shaft will result in a savings of grip weight, as much as 43 grams as compared to conventional grips. Alternatively, a cap (not shown) may be integrally formed on the upper end of the sleeve.

It should be particularly noted that the strip S can readily be replaced when it becomes worn or damaged, while the sleeve 28 will remain secured to the golf club shaft 20. The golfer need only remove ferrule 56 or the finishing tape interposed between the bottom of the original strip, and then remove the original strip. A new strip is then spirally wrapped about the sleeve. Finally, a new ferrule or finishing tape is interposed between the bottom of the new strip and the golf club shaft.

It should also be particularly noted that with the aforedescribed grip of the present invention the exterior surface of the polyurethane layer provides tackiness that assures a firm contact of the golfer's hands with the grip at all times. This advantage can be enhanced by the provision of the perforations described hereinbefore. The use of the perforations not only increases absorption and allows for faster drying of the grip, but also further enhances a cushioning effect of the grip by providing a controlled restriction of air escaping from within the pores of the textile layer when the grip is grasped by the golfer.

It will be apparent to those skilled in the art that various modifications may be made without departing from the spirit of the present invention.

What is claimed is:

1. The combination of a golf club shaft having a hollow interior upper end, and a grip, such combination comprising:

a strip consisting of an open-pored felt layer having a generally flat inner surface and a smooth closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorbs shocks and provides tackiness so as to inhibit slippage of a user's hand relative to the shaft;

heat-compressed recessed reinforcing side edges formed in the polyurethane layer of the strip along the length of the strip;

with the strip being spirally wrapped about the upper portion of the shaft to define the grip;

a cap formed with an inner skirt tightly telescopically received by the hollow interior upper end of the shaft, an outer skirt that depends downwardly over the upper portion of the strip to restrain the strip against unwinding relative to the shaft, and a cover integral with the inner and outer skirts extending over the upper extremity of the shaft; and means interposed between the lower end of the strip and the shaft to restrain unwrapping of the lower portion of the strip relative to the shaft.

2. The grip of claim 1, wherein the radially extending surfaces of the recessed reinforcing side edges of the strip are in tight abutment when the strip is spirally wrapped about said shaft.

3. The grip of claim 1, wherein the ratio of the thickness of the polyurethane layer to the felt layer is a minimum of about 0.18.

4. The grip of claim 1, wherein the layers are formed with air-passing perforations that increase perspiration absorption of the strip and enhance the cushioning effect of the grip by providing a controlled restriction of air escaping from within the felt layer when the grip is grasped by a golfer.

5. The grip of claim 1, wherein the grip weighs about 10–13 grams.

6. The grip of claim 1, wherein the heat-reinforcing side edges of the strip have a width of about 2 millimeters and the heat-reinforcing side edges have a depth of about 0.5 millimeters.

7. The grip of claim 1 wherein the grip-receiving portion of the shaft is flared radially outwardly relative to the portion of the shaft below the grip.

8. The grip of claim 1, wherein the strip includes a starting end formed with a tongue and a notch at the inner end of the tongue, with the tongue fitting within the notch when the strip is wrapped about the shaft to provide a smooth configuration of the strip relative to the shaft, and with the outer skirt of the cap covering the tongue to restrain the tongue from unraveling away from the shaft, and with the trailing edge of the strip being formed with a second tongue to provide a smooth transition of the trailing edge of the strip to the shaft.

9. The grip of claim 2 wherein the strip includes a starting end formed with a tongue and a notch at the inner end of the tongue, with the tongue fitting within the notch when the strip is wrapped about the shaft to provide a smooth configuration of the strip relative to the shaft, and with the outer skirt of the cap covering the tongue to restrain the tongue from unraveling away from the shaft, and with the trailing edge of the strip being formed with a second tongue to provide a smooth transition of the trailing edge of the strip to the shaft.

10. The grip of claim 2, wherein the layers are formed with air-passing perforations that increase perspiration absorption of the strip and enhance the cushioning effect of the grip by providing a controlled restriction of air escaping from within the pores of the felt layer when the grip is grasped by a golfer.

11. The grip of claim 2, wherein the heat-reinforced side edges have a width of about 2 millimeters and the heat-reinforced side edges have a depth of about 0.5 millimeters.

12. The grip of claim 2, wherein the grip weighs about 10–13 grams.

* * * * *